(12) United States Patent
Nakashima et al.

(10) Patent No.: US 12,136,337 B2
(45) Date of Patent: Nov. 5, 2024

(54) INFORMATION PROCESSING APPARATUS, PROGRAM, AND INFORMATION PROCESSING METHOD

(71) Applicant: TOYOTA JIDOSHA KABUSHIKI KAISHA, Toyota (JP)

(72) Inventors: Toyokazu Nakashima, Kasugai (JP); Ryuichi Kamaga, Nagoya (JP); Mitsuhiro Miura, Okazaki (JP); Yasuhiro Baba, Gifii-ken (JP); Tomokazu Maya, Nagoya (JP); Ryosuke Kobayashi, Nagakute (JP); Genshi Kuno, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 17/751,838

(22) Filed: May 24, 2022

(65) Prior Publication Data

US 2022/0406173 A1    Dec. 22, 2022

(30) Foreign Application Priority Data

Jun. 17, 2021   (JP) ................................ 2021-101116

(51) Int. Cl.
*G08G 1/01* (2006.01)
*G06V 20/52* (2022.01)
*G08G 1/04* (2006.01)

(52) U.S. Cl.
CPC .......... *G08G 1/0116* (2013.01); *G06V 20/52* (2022.01); *G08G 1/04* (2013.01)

(58) Field of Classification Search
None
See application file for complete search history.

(56) References Cited

U.S. PATENT DOCUMENTS

| 7,129,597 B2* | 10/2006 | Proefke ............... B60R 25/24 |
| | | 180/289 |
| 9,639,804 B1* | 5/2017 | Palmer ................. B60C 9/00 |
| 2010/0030434 A1* | 2/2010 | Okabe .................. B60K 28/06 |
| | | 719/327 |

(Continued)

FOREIGN PATENT DOCUMENTS

| JP | 2020-95475 A | 6/2020 |
| JP | 2020-190775 A | 11/2020 |

OTHER PUBLICATIONS

Katakana, "My Heart Was Excited! Driving by a Wonderful Gentleman (Colorful Car Life "Let's Drive on Our Lives Lightly")", Serai.jp, Feb. 17, 2019, pp. 1-3, https://serai.ip/living/353365.

(Continued)

*Primary Examiner* — Adam D Tissot
*Assistant Examiner* — Garrett F Evans
(74) *Attorney, Agent, or Firm* — Sughrue Mion, PLLC

(57) ABSTRACT

An information processing apparatus capable of communicating with a vehicle includes a control unit and a communication unit. The control unit is configured to acquire, from the vehicle via the communication unit, vehicle information including at least one of open-close information of a door of the vehicle and location information of the vehicle, and determine a personality of a driver of the vehicle based on the vehicle information.

20 Claims, 9 Drawing Sheets

(56) References Cited

U.S. PATENT DOCUMENTS

2014/0056438 A1\* 2/2014 Baalu .................... B60Q 5/008
                                                        381/86
2020/0191583 A1    6/2020 Ishikawa et al.
2022/0319308 A1\* 10/2022 Jalali .................... G08G 1/0145

OTHER PUBLICATIONS

Japanese Office Action dated Jun. 25, 2024 in Application No. 2021-101116.

\* cited by examiner

FIG. 4

| DATE AND TIME | DOOR OPENED AND CLOSED | OPEN-CLOSE SPEED EXCEEDS REFERENCE VALUE ? |
|---|---|---|
| 9:00, APRIL 1, 2021 | FRONT PASSENGER SEAT SIDE | YES |
| 9:01, APRIL 1, 2021 | DRIVER SEAT SIDE | NO |
| 11:00, APRIL 1, 2021 | DRIVER SEAT SIDE | NO |
| 11:01, APRIL 1, 2021 | FRONT PASSENGER SEAT SIDE | YES |

INFORMATION PROCESSING APPARATUS, PROGRAM, AND INFORMATION PROCESSING METHOD

CROSS-REFERENCE TO RELATED APPLICATION

This application claims priority to Japanese Patent Application No. 2021-101116 filed on Jun. 17, 2021, incorporated herein by reference in its entirety.

BACKGROUND

1. Technical Field

The disclosure relates to an information processing apparatus, a program, and an information processing method.

2. Description of Related Art

There is known a technology to estimate the personality of a driver based on identified driving characteristics (for example, Japanese Unexamined Patent Application Publication No. 2020-190775 (JP 2020-190775 A)).

SUMMARY

The above-described existing technology estimates the personality of the driver based on only driving operation, the personality of the driver is not able to be estimated from vehicle information other than driving operation.

The disclosure provides an information processing apparatus, a program, and an information processing method capable of determining a personality from vehicle information other than driving operation.

An information processing apparatus according to an embodiment of the disclosure is an information processing apparatus capable of communicating with a vehicle. The information processing apparatus includes a control unit and a communication unit. The control unit is configured to acquire, from the vehicle via the communication unit, vehicle information including at least one of open-close information of a door of the vehicle and location information of the vehicle, and determine a personality of a driver of the vehicle based on the vehicle information.

A program according to an embodiment of the disclosure causes a computer serving as an information processing apparatus capable of communicating with a vehicle, to execute operations. The operations include acquiring, from the vehicle, vehicle information including at least one of open-close information of a door of the vehicle and location information of the vehicle, and determining a personality of a driver of the vehicle based on the vehicle information.

An information processing method according to an embodiment of the disclosure is an information processing method that is executed by an information processing apparatus capable of communicating with a vehicle. The information processing method includes acquiring, from the vehicle, vehicle information including at least one of open-close information of a door of the vehicle and location information of the vehicle, and determining a personality of a driver of the vehicle based on the vehicle information.

With the information processing apparatus, the program, and the information processing method according to the embodiments of the disclosure, it is possible to determine a personality from vehicle information other than driving operation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a table showing the data structure of an open-close database (DB);

DETAILED DESCRIPTION OF EMBODIMENTS

Figure 1:
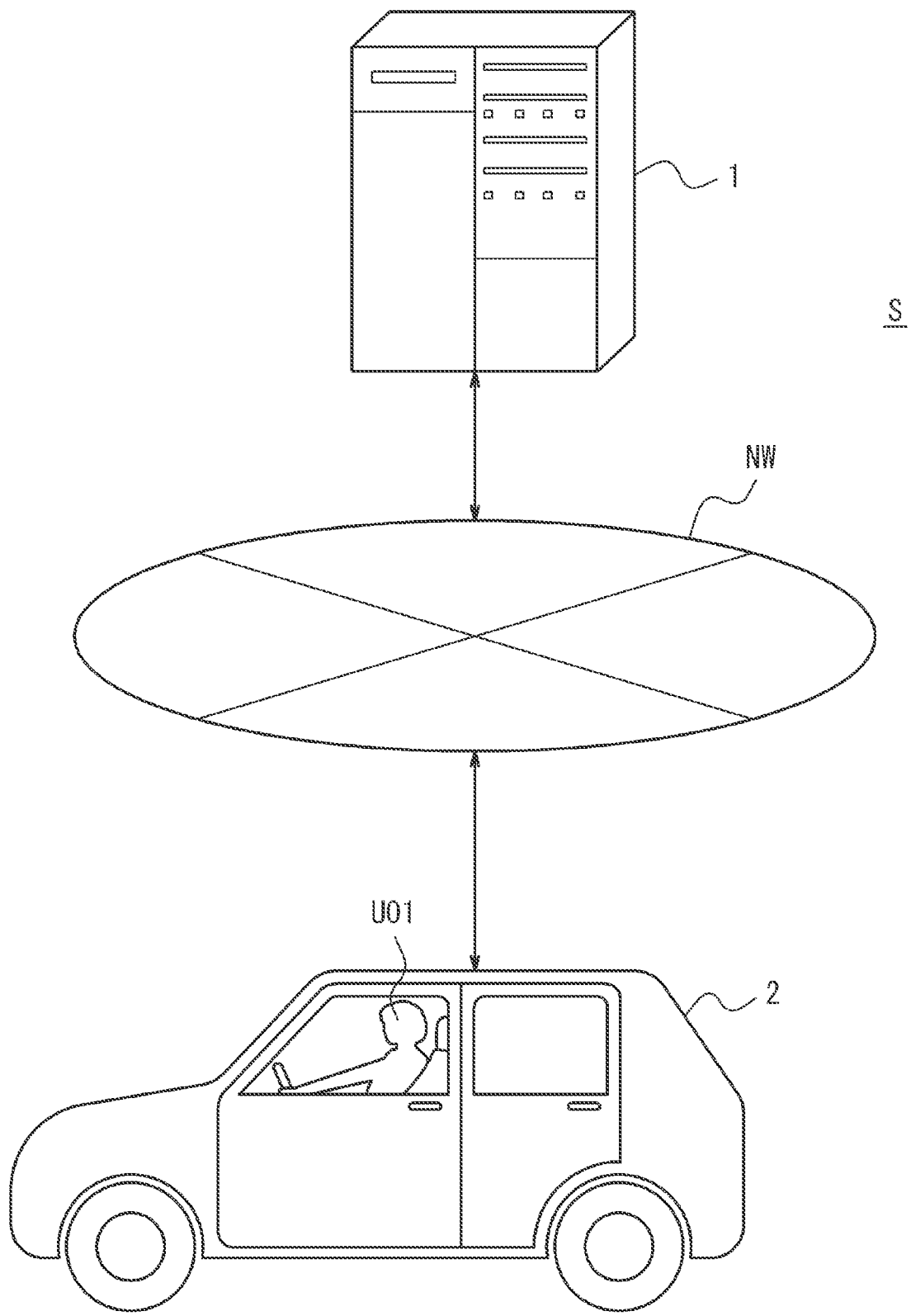
FIG. 1 is a schematic diagram of an information processing system according to an embodiment.

FIG. 1 is a schematic diagram of an information processing system S according to an embodiment. The information processing system S includes an information processing apparatus 1 and a vehicle 2. The information processing apparatus 1 is capable of communicating with the vehicle 2 via a network NW. The network NW includes, for example, a mobile communication network or the Internet.

For the sake of convenience of description in FIG. 1, one information processing apparatus 1 is shown. The number of the information processing apparatuses 1 is not limited thereto. For example, a process that is executed by the information processing apparatus 1 may be executed by a plurality of the information processing apparatuses 1 disposed in a distributed manner.

The outline of the process that is executed by the information processing apparatus 1 according to the present embodiment will be described. A control unit 11 of the information processing apparatus 1 acquires, from the vehicle 2 via a communication unit 12, vehicle information that includes at least one of door open-close information of the vehicle 2 and location information of the vehicle 2, and determines the personality of a driver of the vehicle 2 based on the vehicle information. With this configuration, the information processing apparatus 1 is able to determine the personality of the driver from the vehicle information that includes information other than driving operation. Thus, the information processing apparatus 1 is able to increase the accuracy of determining the personality of the driver.

The information processing apparatus 1 may be a server that assists the provision of service by a business operator. The information processing apparatus 1 may be installed in, for example, a facility dedicated to a business operator or a shared facility including a data center. As an alternative example, the information processing apparatus 1 may be mounted on the vehicle 2.

The vehicle 2 includes a selected type of vehicle, such as a gasoline vehicle, a diesel vehicle, an HEV, a PHEV, a BEV, and an FCEV. "HEV" is an abbreviation of hybrid electric vehicle. "PHEV" is an abbreviation of plug-in hybrid electric vehicle. "BEV" is an abbreviation of battery electric vehicle. "FCEV" is an abbreviation of fuel cell electric vehicle. The vehicle 2 is driven by the driver in the present embodiment. As an alternative example, the vehicle 2 may be automatically driven at a selected level. An automation level is, for example, any one of level 1 to level 5 in SAE levels. "SAE" is an abbreviation of Society of Automotive Engineers. The vehicle 2 may be a MaaS-dedicated vehicle. "MaaS" is an abbreviation of Mobility as a Service.

Figure 2:
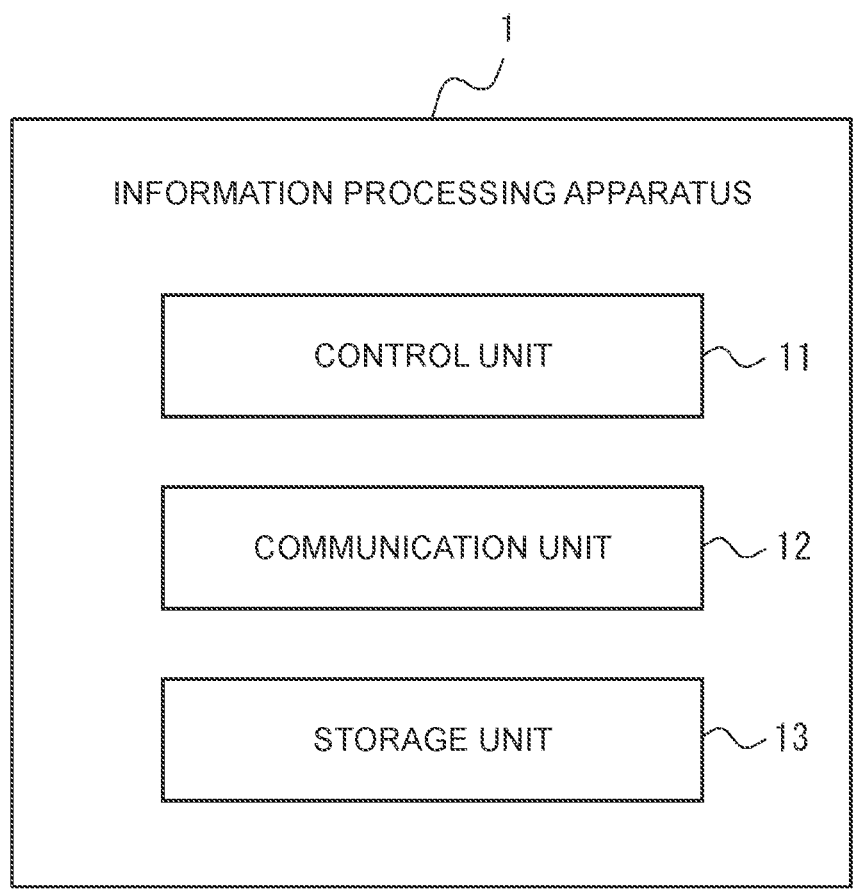
FIG. 2 is a block diagram showing the configuration of an information processing apparatus.

The internal configuration of the information processing apparatus 1 will be described in detail with reference to FIG. 2.

The information processing apparatus 1 includes the control unit 11, the communication unit 12, and a storage unit 13. The components of the information processing apparatus 1 are connected to one another via, for example, dedicated lines such that communication is possible.

The control unit 11 includes, for example, one or more general-purpose processors that include a central processing unit (CPU) or a micro processing unit (MPU). The control unit 11 may include one or more special-purpose processors specialized to a specific process. The control unit 11 may include one or more dedicated circuits instead of including a processor. The dedicated circuit may be, for example, a field-programmable gate array (FPGA) or an application specific integrated circuit (ASIC). The control unit 11 may include an electronic control unit (ECU).

The communication unit 12 includes a communication module that supports one or more wired or wireless local area network (LAN) standards for connection with a network. The communication unit 12 may include a module that supports one or more mobile communication standards including Long Term Evolution (LTE), 4th Generation (4G), or 5th Generation (5G). The communication unit 12 may include a communication module or the like that supports one or more near field communication standards or specifications including Bluetooth (registered trademark), Air-Drop (registered trademark), IrDA, ZigBee (registered trademark), Felica (registered trademark), or RFID. The communication unit 12 transmits and receives selected information via a network.

The storage unit 13 includes, for example, a semiconductor memory, a magnetic memory, an optical memory, or a combination of at least two types of these memories; however, the storage unit 13 is not limited thereto. The semiconductor memory is, for example, a RAM or a ROM. The RAM is, for example, an SRAM or a DRAM. The ROM is, for example, an EEPROM. The storage unit 13 may function as, for example, a main storage device, an auxiliary storage device, or a cache memory. The storage unit 13 may store information about a result analyzed or processed by the control unit 11. The storage unit 13 may store various pieces of information about the operation or control of the information processing apparatus 1. The storage unit 13 may store a system program, an application program, embedded software, and the like. The storage unit 13 includes an open-close DB (described later).

Figure 3:
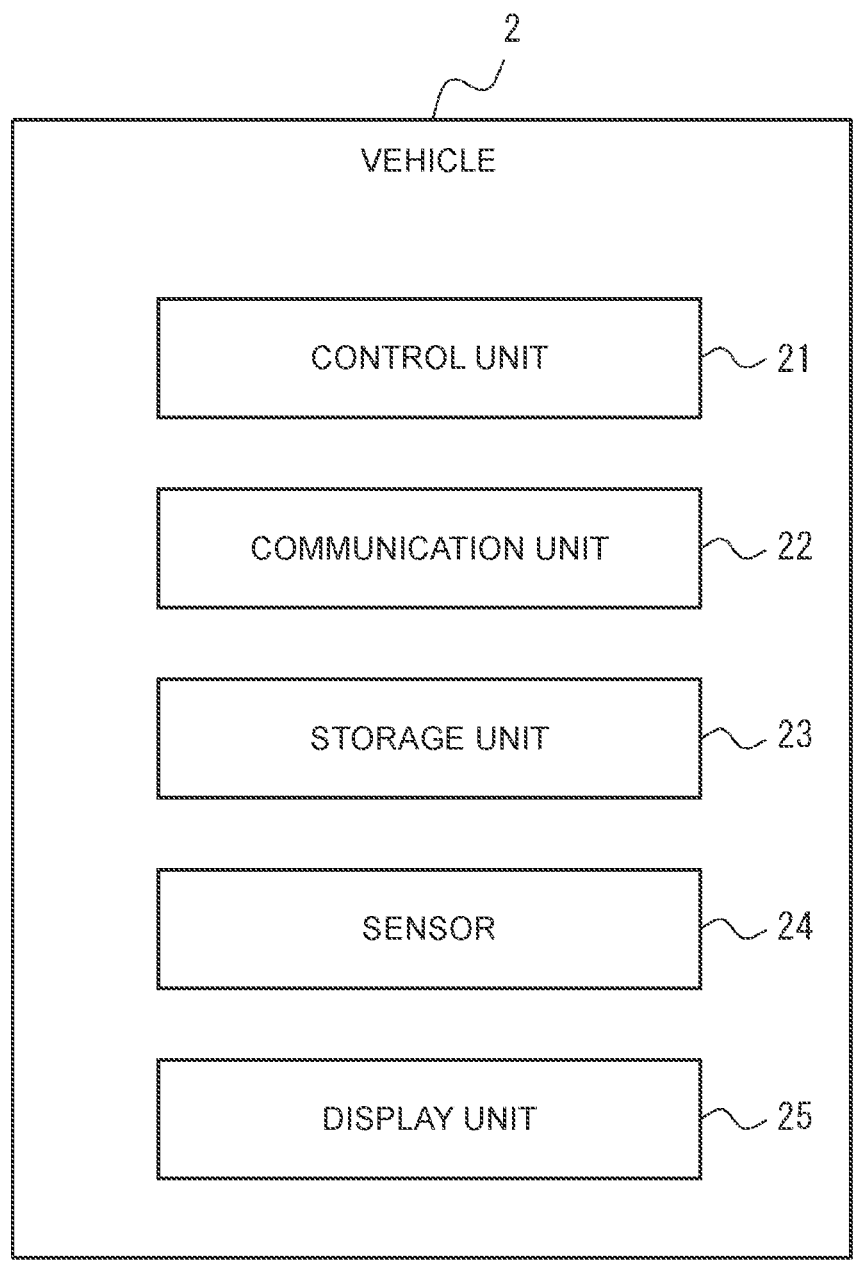
FIG. 3 is a block diagram showing the configuration of a vehicle.

The internal configuration of the vehicle 2 will be described in detail with reference to FIG. 3.

The vehicle 2 includes a control unit 21, a communication unit 22, a storage unit 23, a sensor 24, and a display unit 25. The components of the vehicle 2 are connected to one another via, for example, dedicated lines such that communication is possible.

The hardware configuration of each of the control unit 21, the communication unit 22, and the storage unit 23 of the vehicle 2 may be the same as the hardware configuration of each of the control unit 11, the communication unit 12, and the storage unit 13 of the information processing apparatus 1. The description here is omitted.

The sensor 24 includes sensors that detect selected pieces of vehicle information on the vehicle 2 or an interface with sensors. The sensor 24 may include, for example, at least one of the following sensors.

Door open-close sensor
Location information sensor
Accelerator sensor
Brake sensor
Sonic sensor
Seat sensor
Vehicle height sensor
Seatbelt warning sensor
Image sensor
Motion sensor
Speed sensor
Acceleration sensor
Steering sensor
Other selected sensors that detect an odometer value, the specifications of an engine, and the like The sensor 24 transmits the detected vehicle information to the control unit 21.

The location information sensor includes at least one GNSS receiver. "GNSS" is an abbreviation of Global Navigation Satellite System. The GNSS includes, for example, at least any one of GPS, QZSS, BeiDou, GLONASS, and Galileo. "GPS" is an abbreviation of Global Positioning System. "QZSS" is an abbreviation of Quasi-Zenith Satellite System. The satellite of QZSS is called a quasi-zenith satellite. "GLONASS" is an abbreviation of Global Navigation Satellite System. The sensor 24 measures the location of the vehicle 2. A result measured by the sensor 24 is acquired as the location information of the vehicle 2 by the control unit 21. The term "location information" is information for identifying the location of the vehicle 2 and includes, for example, coordinates.

The display unit 25 is, for example, a display. The display is, for example, an LCD or an organic EL display. "LCD" is an abbreviation of liquid crystal display. "EL" is an abbreviation of electroluminescence. The display unit 25 may be connected to the vehicle 2 as an external output device instead of being provided in the vehicle 2. For example, a selected method, such as USB, HDMI (registered trademark), and Bluetooth (registered trademark), may be used as a connection method.

Hereinafter, the process that is executed in the information processing system S according to the present embodiment will be described in detail. Here, a scene in which the information processing apparatus 1 acquires, from the vehicle 2, vehicle information detected by the sensor 24 and determines the personality of a driver U01 of the vehicle 2 based on the vehicle information will be described as an example. Here, it is determined whether the driver U01 has a personality to take care of others as an example. As an alternative example, it may be determined whether the driver U01 has a personality kind to others.

The vehicle information here includes at least one of door open-close information of the vehicle 2 and location information of the vehicle 2.

First Embodiment

When the sensor 24 is a door open-close sensor, the vehicle 2 acquires, from the sensor 24, the door open-close information during times from before the vehicle 2 starts moving to after the vehicle 2 stops (that is, before and after one-trip travel of the vehicle 2). The vehicle 2 transmits the open-close information to the information processing apparatus 1.

As shown in FIG. 4, the control unit 11 of the information processing apparatus 1 stores the open-close information in the open-close DB. The open-close DB stores which one of the doors of the vehicle 2 is opened and closed (which corresponds to a door opened and closed) and whether the open-close speed of the opened and closed door exceeds a reference value (which corresponds to "the open-close speed exceeds a reference value?") in association with a date and time at which the door has been opened and closed (which corresponds to "date and time"). In this way, the open-close information includes information that indicates the order in which a plurality of doors of the vehicle 2 is opened and closed. The plurality of doors here includes a driver seat-side door and a front passenger seat-side door. As an alternative example or an additional example, the plurality of doors may include rear passenger seat doors.

Figure 5:
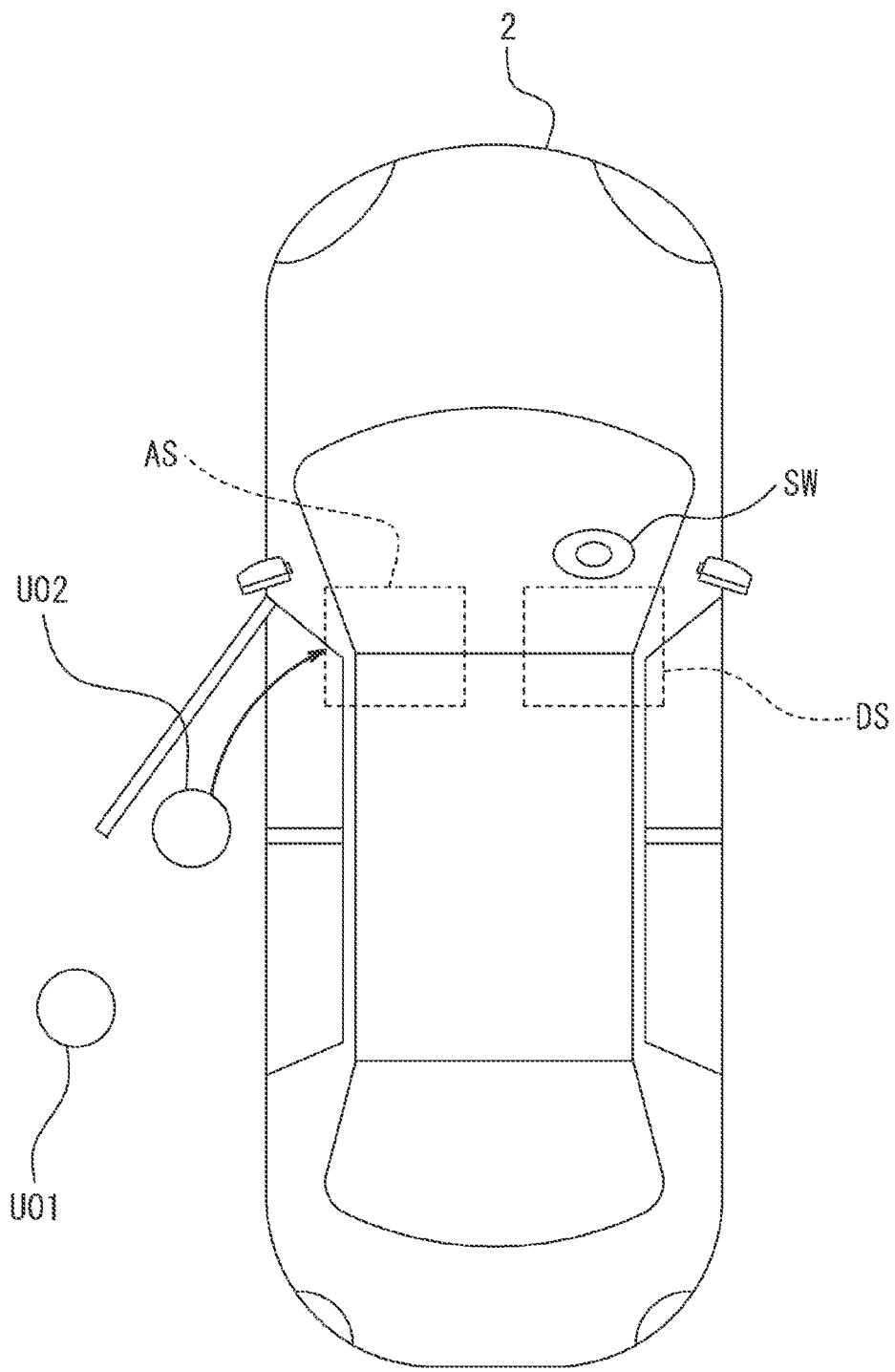
FIG. 5 is a view showing a state of doors before a fellow passenger sits in a front passenger seat.
Figure 6:
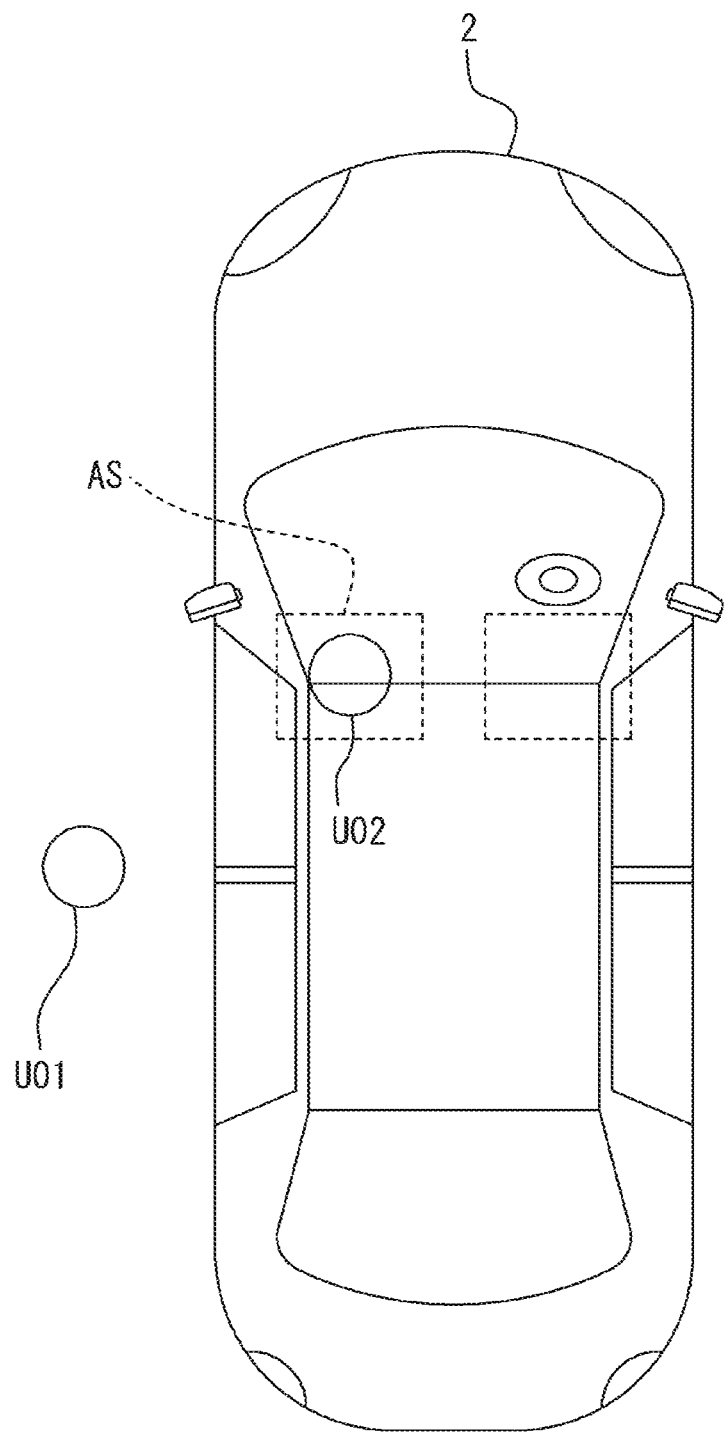
FIG. 6 is a view showing a state of the doors after the fellow passenger sits in the front passenger seat.

As shown in FIG. 4, before the vehicle 2 starts moving, the front passenger seat-side door is opened and closed at 9:00. In this case, as shown in FIG. 5, a fellow passenger U02 gets into a front passenger seat AS of the vehicle 2. After that, as shown in FIG. 6, the fellow passenger U02 sits in the front passenger seat AS. At this point in time, the driver U01 is not seated in a driver seat DS where a steering wheel SW is provided.

Figure 7:
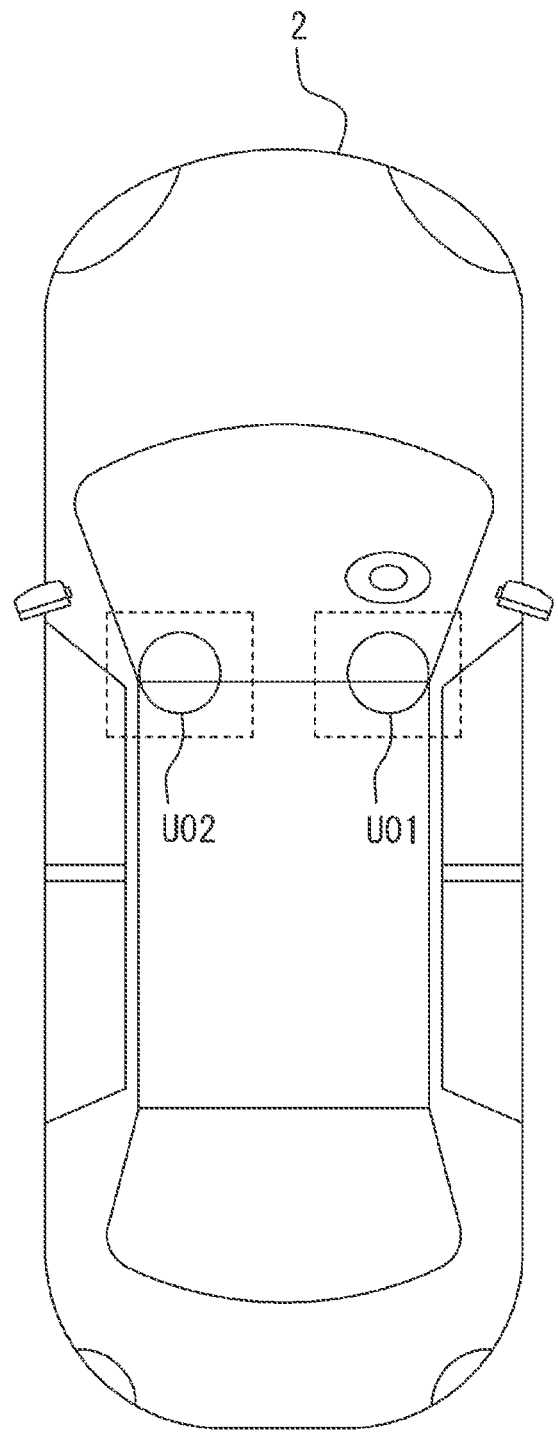
FIG. 7 is a view showing a state of the doors after a driver sits in a driver seat.

As shown in FIG. 4, before the vehicle 2 starts moving, the driver seat-side door is opened and closed at 9:01. After the door is opened and closed, the driver U01 sits in the driver seat DS as shown in FIG. 7.

After that, the vehicle 2 starts moving and runs and, when the vehicle 2 arrives at a destination, stops. As shown in FIG. 4, the driver seat-side door is opened and closed at 11:00, and the driver U01 gets off from the vehicle 2. The driver U01 opens the front passenger seat-side door at 11:01 and assists the fellow passenger U02 in getting off from the vehicle 2.

The control unit 11 determines that the driver U01 has taken care of the fellow passenger U02 when the front passenger seat-side door is opened and closed first before the vehicle 2 starts moving and the driver seat-side door is opened and closed first after the vehicle 2 stops as described above.

The control unit 11 calculates, over a predetermined period, the frequency that the front passenger seat-side door is opened and closed first before the vehicle 2 starts moving and the driver seat-side door is opened and closed first after the vehicle 2 stops. The frequency may be the number of times the driver U01 has taken care of the fellow passenger U02 or the ratio of the number of times the driver U01 has taken care of the fellow passenger U02 to the total number of times of travel.

When the calculated frequency exceeds a reference value, the control unit 11 determines that the driver U01 has a personality to take care of the fellow passenger U02.

As an alternative example or an additional example, the control unit 11 may determine whether the driver U01 has a personality to take care of the fellow passenger U02 from the open-close speed at which the door is opened and closed. Specifically, the control unit 11 calculates the frequency the speed at which at least one of the driver seat-side door and the front passenger seat-side door is opened and closed exceeds a reference value. The frequency may be the number of times the speed at which the door is opened and closed exceeds the reference value or may be the ratio of the number of times the open-close speed exceeds the reference value to the total number of times the door is opened and closed.

When the calculated frequency exceeds the reference value, the control unit 11 determines that the driver U01 has a personality to take care of the fellow passenger U02. The control unit 11 provides a notification of the determination result to the driver U01 or the like. Providing a notification with voice or screen display via a terminal operated by the driver U01 or providing a notification with voice or screen display via the vehicle 2 may be adopted as a notification method.

Second Embodiment

Figure 8:
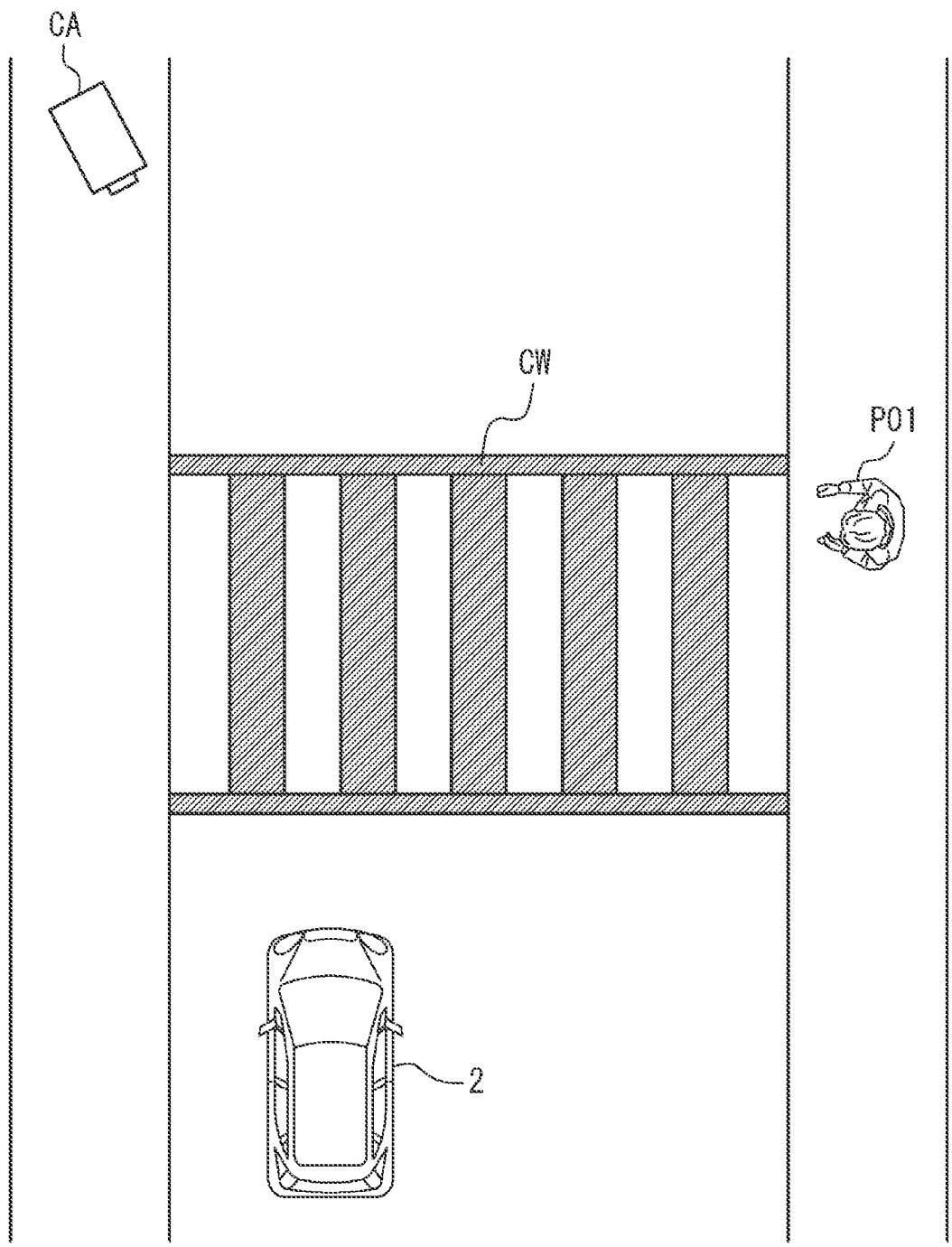
FIG. 8 is a view showing a person and the vehicle around a crosswalk.

The information processing apparatus 1 is capable of communicating with a camera CA shown in FIG. 8 via the network NW. As shown in FIG. 8, the camera CA is installed near a crosswalk CW (that is, within a predetermined distance from the crosswalk CW). The control unit 11 of the information processing apparatus 1 acquires a captured image from the camera CA via the communication unit 12. The control unit 11 analyzes the captured image and detects that a person P01 is waiting for crossing the crosswalk CW.

When the sensor 24 is a location information sensor, the control unit 11 acquires the location information of the vehicle 2 from the vehicle 2. The control unit 11 detects that the vehicle 2 is heading toward the crosswalk CW. The control unit 11 determines whether the vehicle 2 has stopped before the crosswalk CW when the person P01 is waiting for crossing the crosswalk CW, based on the location information of the vehicle 2. When the control unit 11 determines that the vehicle 2 has stopped before the crosswalk CW when the person P01 is waiting for crossing the crosswalk CW, the control unit 11 determines that the driver U01 of the vehicle 2 has a personality to take care of persons P01 (that is, pedestrian). The control unit 11 provides a notification of the determination result to the driver U01 or the like.

Third Embodiment

When the sensor 24 of the vehicle 2 is an accelerator sensor, the sensor 24 acquires information on the accelerator depression amount of the vehicle 2. The vehicle 2 transmits information on the accelerator depression amount, the location information of the vehicle 2, and time information associated with the location information to the information processing apparatus 1.

The information processing apparatus 1 determines whether the vehicle 2 is running in a residential street at night and the accelerator depression amount is lower than a reference value from the location information of the vehicle 2, the time information, and the information on the accelerator depression amount. A night time zone, the area of residential streets, and the reference value of the accelerator depression amount may be selectively set.

When the control unit 11 determines that the vehicle 2 is running in a residential street at night and the accelerator depression amount is lower than the reference value, the control unit 11 determines that the driver U01 of the vehicle 2 has a personality to take care of residents in residential streets.

As an alternative example, when the sensor 24 is a sonic sensor, the sensor 24 acquires information on the running sound of the vehicle 2. The unit of running sound may be, for example, decibel or sone. The vehicle 2 transmits the information on the running sound and the location information of the vehicle 2 to the information processing apparatus 1.

When the control unit 11 of the information processing apparatus 1 acquires the location information and the information on the running sound from the vehicle 2, the control unit 11 determines whether the vehicle 2 is running in a residential street and the running sound is lower than a reference value. The area of residential streets and the reference value of the running sound may be selectively set.

When the control unit 11 determines that the vehicle 2 is running in a residential street and the running sound is lower than the reference value, the control unit 11 determines that the driver U01 of the vehicle 2 has a personality to take care of residents in residential streets. The control unit 11 provides a notification of the determination result to the driver U01 or the like.

Flowchart

Figure 9:
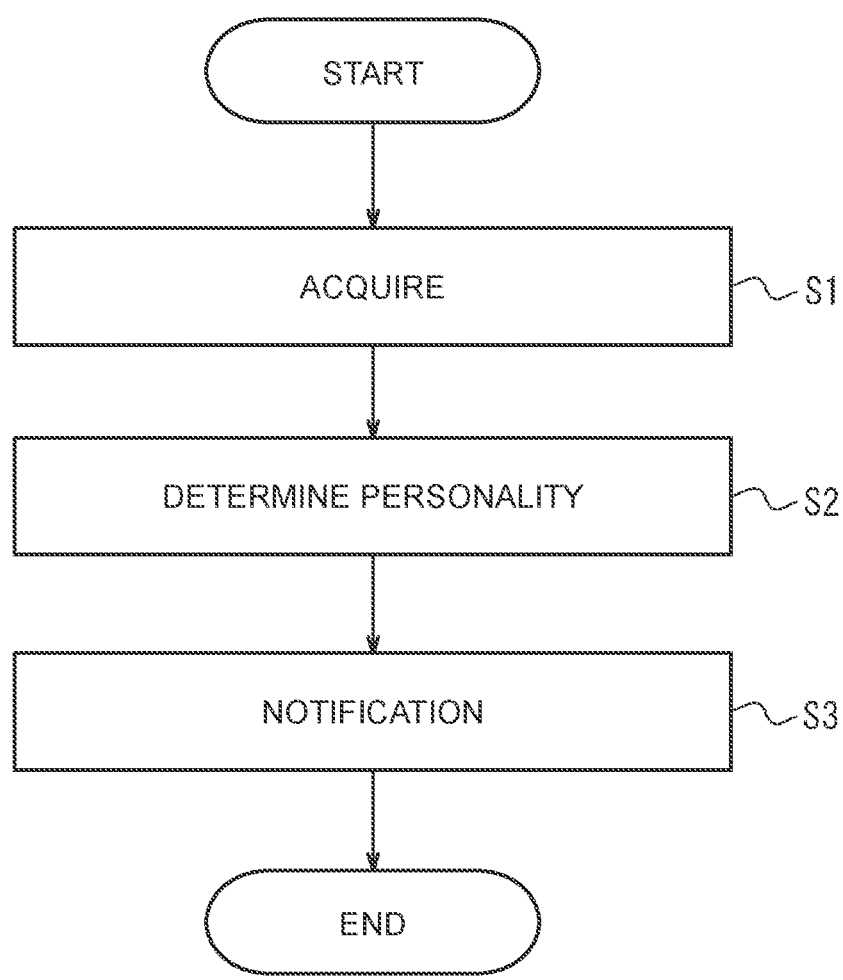
FIG. 9 is a flowchart showing the operations of the information processing apparatus.

An information processing method that is executed by the control unit 11 of the information processing apparatus 1 will be described with reference to FIG. 9.

In step S1, the control unit 11 acquires, from the vehicle 2, vehicle information that includes at least one of door open-close information of the vehicle 2 and location information of the vehicle 2.

In step S2, the control unit 11 determines the personality of the driver of the vehicle 2 based on the acquired vehicle information.

In step S3, the control unit 11 provides a notification of the determination result in step S2 to the driver U01 or the like.

As described above, according to the present embodiments, the control unit 11 of the information processing apparatus 1 acquires, from the vehicle 2 via the communication unit 12, vehicle information that includes at least one of door open-close information of the vehicle 2 and location information of the vehicle 2, and determines the personality of a driver of the vehicle 2 based on the vehicle information. With this configuration, the information processing apparatus 1 is able to determine the personality of the driver from the vehicle information that includes information other than driving operation. Thus, the information processing apparatus 1 is able to increase the accuracy of determining the personality of the driver.

According to the present embodiment, the open-close information includes information that indicates the order in which a plurality of doors of the vehicle 2 is opened and closed. The plurality of doors here includes a driver seat-side door and a front passenger seat-side door. The control unit 11 determines that the driver has a personality to take care of a fellow passenger when the frequency that the front passenger seat-side door is opened and closed in advance of the driver seat-side door before the vehicle 2 starts moving and the driver seat-side door is opened and closed in advance of the front passenger seat-side door after the vehicle 2 stops exceeds the reference value. With this configuration, the information processing apparatus 1 is able to determine the personality of a driver from the order in which the doors are opened and closed, so it is possible to further increase the accuracy of determining the personality.

According to the present embodiment, when the control unit 11 determines that the speed at which the door of the vehicle 2 is opened and closed exceeds the reference value, the control unit 11 determines that the driver has a personality to take care of a fellow passenger. With this configuration, the information processing apparatus 1 is able to determine the personality of a driver from the open-close speed of the door, so it is possible to further increase the accuracy of determining the personality.

According to the present embodiments, the information processing apparatus 1 is capable of communicating with a camera installed near a crosswalk. When the control unit 11 detects that a person is waiting for crossing the crosswalk from a captured image of the camera and determines that the vehicle 2 has stopped before the crosswalk when the person is waiting for crossing the crosswalk from the location information of the vehicle 2, the control unit 11 determines that the driver has a personality to take care of persons. With this configuration, the control unit 11 is able to determine whether the driver gives priority to pedestrians, so it is possible to further increase the accuracy of determining the personality.

According to the present embodiments, the control unit 11 further acquires, from the vehicle 2, information on the accelerator depression amount of the vehicle 2, and determines that the driver has a personality to take care of residents when the control unit 11 determines that the vehicle 2 is running in a residential street at night and the accelerator depression amount is lower than the reference value from the location information, the time information associated with the location information, and the information on the accelerator depression amount. According to the present embodiments, the control unit 11 acquires, from the vehicle 2, information on the running sound of the vehicle 2, and determines that the driver has a personality to take care of residents when the control unit 11 determines that the vehicle 2 is running in a residential street and the running sound is lower than the reference value from the location information and the information on the running sound. With these configuration, the information processing apparatus 1 is able to determine whether the driver has a personality to take care of residents, so it is possible to further increase the accuracy of determining the personality.

The disclosure is described based on the drawings and the embodiments, and it is noted that persons skilled in the art can make various modifications and alterations based on the disclosure. Modifications are possible without departing from the purport of the disclosure. For example, the functions, and the like, included in the devices, steps, or other components, may be rearranged without any logical contradiction, and a plurality of devices, steps, or other components, may be combined as one or may be divided.

For example, in the above-described embodiments, a program that implements one or some or all of the functions or processes of the information processing apparatus 1 may be recorded on a computer-readable recording medium. The computer-readable recording medium includes a non-transitory computer-readable medium and is, for example, a magnetic recording device, an optical disk, a magnetooptical recording medium, or a semiconductor memory. Distribution of the program is performed by, for example, selling, transferring, or lending a portable recording medium, such as a digital versatile disc (DVD) and a compact disc read only memory (CD-ROM), on which the program is recorded. Alternatively, distribution of the program may be performed by storing the program in a storage of a selected server and transmitting the program from the selected server to another computer. Alternatively, the program may be provided as a program product. The disclosure may be implemented as a program executable on a processor.

A computer once stores, for example, a program recorded on a portable recording medium or a program transferred from a server in a main storage device. Then, the computer causes a processor to read the program stored in the main storage device and executes a process according to the read program on the processor. The computer may directly read a program from a portable recording medium and execute a process according to the program. Each time a program is transferred from a server to a computer, the computer may occasionally execute a process according to the received program. A program may be executed by a so-called ASP service in which a program is not transferred from a server to a computer and a function is implemented only by providing an execution instruction and acquiring a result. "ASP" is an abbreviation of application service provider. A program is information subjected to a process on an electronic computer and includes those similar to a program. For example, data that is not a direct command to a computer and that has a property of defining a process of a computer corresponds to "those similar to a program".

What is claimed is:

1. An information processing apparatus configured to communicate with a vehicle, the information processing apparatus comprising:
   control circuitry; and
   first communication circuitry, wherein
   the control circuitry is configured to:
      control the first communication circuitry to communicate with second communication circuitry of the vehicle over a Bluetooth connection or a mobile communication network to acquire, from the vehicle, vehicle information including open-close information of a door of the vehicle has based on an open-door close sensor,
      determine a personality of a driver of the vehicle based on the vehicle information including a frequency in which the door of the vehicle is opened and closed, and
      control the first communication circuitry to transmit to the second communication circuitry of the vehicle over the Bluetooth connection or the mobile communication network an instruction that causes vehicle to display, on a display of the vehicle, a message indicating the personality of the driver.

2. The information processing apparatus according to claim 1, wherein the open-close information includes information that indicates an order in which a plurality of doors of the vehicle is opened and closed.

3. The information processing apparatus according to claim 2, wherein:
   the plurality of doors includes a driver seat-side door and a front passenger seat-side door, and
   the control circuitry is configured to determine the personality of the driver based on a frequency that the front passenger seat-side door is opened and closed in advance of the driver seat-side door before the vehicle starts moving and the driver seat-side door is opened and closed in advance of the front passenger seat-side door after the vehicle is stopped exceeding a reference value.

4. The information processing apparatus according to claim 1, wherein the control circuitry is configured to determine the personality of the driver based on a speed by which a door of the vehicle is opened and closed exceeding a reference value.

5. The information processing apparatus according to claim 1, wherein:
   the information processing apparatus is configured to communicate with a camera installed near a crosswalk; and
   the control circuitry is configured to:
      control the first communication circuitry to communicate with the second communication circuitry of the vehicle over the Bluetooth connection or the mobile communication network to acquire location information of the vehicle from a position sensor,
      detect that a person is waiting for crossing the crosswalk from an image captured by the camera, and
      determine the personality of the driver based on a determination that the vehicle has stopped before the crosswalk when the person is waiting for crossing the crosswalk from the location information of the vehicle.

6. The information processing apparatus according to claim 1, wherein
   the control circuitry is further configured to:
      control the first communication circuitry to communicate with the second communication circuitry of the vehicle over the Bluetooth connection or the mobile communication network to acquire location information of the vehicle from a position sensor, and acquire information on an accelerator depression amount of the vehicle from the vehicle, and
      determine the personality of the driver based on a determination the vehicle is running in a residential street at night and the accelerator depression amount is less than a reference value from the location information, time information associated with the location information, and the information on the accelerator depression amount.

7. The information processing apparatus according to claim 1, wherein
   the circuitry is configured to:
      control the first communication circuitry to communicate with the second communication circuitry of the vehicle over the Bluetooth connection or the mobile communication network to acquire location information of the vehicle from a position sensor, and acquire information on a running noise of the vehicle, and
      determine personality of the driver based on a determination that the vehicle is running in a residential street and the running noise is lower than a reference value from the location information and information on the running noise.

8. A vehicle comprising:
   one or more sensors comprising an open-door close sensor;
   first communication circuitry operatively coupled to the one or more sensors;
   an information processing apparatus comprising:
      second communication circuitry; and
      control circuitry configured to:
         control the second communication circuitry to communicate with the first communication circuitry of the vehicle over a Bluetooth connection to acquire, from the vehicle, vehicle information including open-close information of a door of the vehicle based on an open-door close sensor,
         determine a personality of a driver of the vehicle based on the vehicle information including a frequency in which the door of the vehicle is opened and closed,
         output, on a display of the vehicle, a message indicating the personality of the driver, and
         control the second communication circuitry to transmit to the first communication circuitry of the vehicle over the Bluetooth connection an instruction that causes vehicle to display, on a display of the vehicle, a message indicating the personality of the driver.

9. A non-transitory computer readable medium having instructions stored therein, which when executed by a processor in an information processing apparatus configured to communicate with a vehicle, cause the processor to execute a method comprising:
controlling first communication circuitry of the information processing apparatus to communicate with second communication circuitry of the vehicle over a Bluetooth connection or a mobile communication network to acquire, from the vehicle, vehicle information including open-close information of a door based on an open-door close sensor;
determining a personality of a driver of the vehicle based on the vehicle information including a frequency in which the door of the vehicle is opened and closed; and
controlling the first communication circuitry to transmit to the second communication circuitry of the vehicle over the Bluetooth connection or the mobile communication network an instruction that causes vehicle to display, on a display of the vehicle, a message indicating the personality of the driver.

10. The non-transitory computer readable medium according to claim 9, wherein the open-close information includes information that indicates an order in which a plurality of doors of the vehicle is opened and closed.

11. The non-transitory computer readable medium according to claim 10, wherein:
the plurality of doors includes a driver seat-side door and a front passenger seat-side door, and
the method further comprises determining the personality of the driver based on a frequency that the front passenger seat-side door is opened and closed in advance of the driver seat-side door before the vehicle starts moving and the driver seat-side door is opened and closed in advance of the front passenger seat-side door after the vehicle is stopped exceeding a reference value.

12. The non-transitory computer readable medium according to claim 9, wherein the method further comprises determining the personality of the driver based on a speed by which a door of the vehicle is opened and closed exceeding a reference value.

13. The non-transitory computer readable medium according to claim 9, wherein:
the information processing apparatus is configured to communicate with a camera installed near a crosswalk; and
the method further comprises:
controlling the first communication circuitry to communicate with the second communication circuitry of the vehicle over the Bluetooth connection or the mobile communication network to acquire location information of the vehicle from a position sensor,
detecting that a person is waiting for crossing the crosswalk from an image captured by the camera, and
determining the personality of the driver based on a determination that the vehicle has stopped before the crosswalk when the person is waiting for crossing the crosswalk from the location information of the vehicle.

14. The non-transitory computer readable medium according to claim 9, wherein the method further comprises:
controlling the first communication circuitry to communicate with the second communication circuitry of the vehicle over the Bluetooth connection or the mobile communication network to acquire location information of the vehicle from a position sensor, and acquiring information on an accelerator depression amount of the vehicle from the vehicle; and
determining the personality of the driver based on a determination the vehicle is running in a residential street at night and the accelerator depression amount is less than a reference value from the location information, time information associated with the location information, and the information on the accelerator depression amount.

15. An information processing method that is executed by an information processing apparatus configured to communicate with a vehicle, the information processing method comprising:
controlling first communication circuitry of the information processing apparatus to communicate with second communication circuitry of the vehicle over a Bluetooth connection or a mobile communication network to acquire, from the vehicle, vehicle information including open-close information of a door based on an open-door close sensor;
determining a personality of a driver of the vehicle based on the vehicle information including a frequency in which the door of the vehicle is opened and closed; and
controlling the first communication circuitry to transmit to the second communication circuitry of the vehicle over the Bluetooth connection or the mobile communication network an instruction that causes vehicle to display, on a display of the vehicle, a message indicating the personality of the driver.

16. The information processing method according to claim 15, wherein the open-close information includes information that indicates an order in which a plurality of doors of the vehicle is opened and closed.

17. The information processing method according to claim 16, wherein:
the plurality of doors includes a driver seat-side door and a front passenger seat-side door, and
the information processing method further comprises determining the personality of the driver based on a frequency that the front passenger seat-side door is opened and closed in advance of the driver seat-side door before the vehicle starts moving and the driver seat-side door is opened and closed in advance of the front passenger seat-side door after the vehicle is stopped exceeding a reference value.

18. The information processing method according to claim 15, further comprising determining the personality of the driver based on a speed by which a door of the vehicle is opened and closed exceeding a reference value.

19. The information processing method according to claim 15, wherein:
the information processing apparatus is configured to communicate with a camera installed near a crosswalk; and
the information processing method further comprises:
controlling the first communication circuitry to communicate with the second communication circuitry of the vehicle over the Bluetooth connection or the mobile communication network to acquire location information of the vehicle from a position sensor,
detecting that a person is waiting for crossing the crosswalk from an image captured by the camera; and determining the personality of the driver based on a determination that the vehicle has stopped before the crosswalk when the person is waiting for crossing the crosswalk from the location information of the vehicle.

20. The information processing method according to claim 15, further comprising:

controlling the first communication circuitry to communicate with the second communication circuitry of the vehicle over the Bluetooth connection or the mobile communication network to acquire location information of the vehicle from a position sensor, and acquiring information on an accelerator depression amount of the vehicle from the vehicle; and determining the personality of the driver based on a determination the vehicle is running in a residential street at night and the accelerator depression amount is less than a reference value from the location information, time information associated with the location information, and the information on the accelerator depression amount.

\* \* \* \* \*